Dec. 18, 1928.  
O. B. SCHELLBERG  
1,696,018  
COLONIC THERAPY APPARATUS  
Filed July 10, 1926
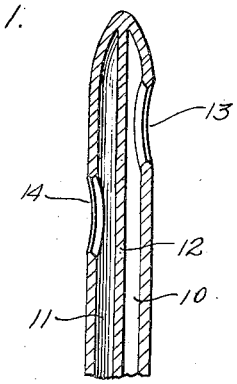
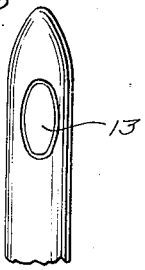
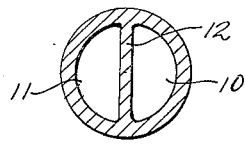
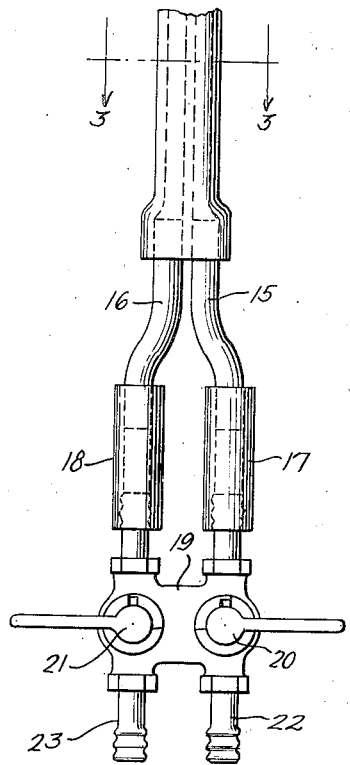
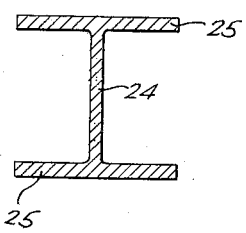
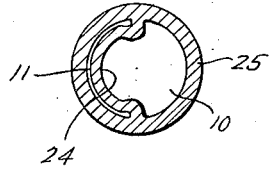
INVENTOR  
OSCAR BOTO SCHELLBERG  
BY   
ATTORNEY Patented Dec. 18, 1928.

1,696,018

UNITED STATES PATENT OFFICE.

OSCAR BOTO SCHELLBERG, OF NEW YORK, N. Y.

COLONIC THERAPHY APPARATUS.

Application filed July 10, 1926. Serial No. 121,585.

Among the principal objects which the present invention has in view are: To provide means for introducing irrigating or other vehicle into the colon of a human being and for withdrawing the said vehicle and matter carried thereby without contaminating the first mentioned means; to provide a supply and drainage implement for introduction in the colon of a human being, said implement having separate supply and drainage channels; to supply and withdraw irrigating and other vehicles to the intestinal region and within the intestines without permitting the withdrawn material to contact with the means for supplying the said vehicle; and to provide manual controls for admitting the said vehicle at will.

Figure 1 is a top plan view of a multiple-ported valve and a twin-passaged colonic tube constructed and arranged in accordance with the present invention, the forward fragment of said tube being shown in section.

Figure 2 is a side view of an end fragment of the irrigating tube.

Figure 3 is an enlarged cross section of said colonic tube, constructed and arranged in accordance with the present invention, the section being taken on the line 3—3 in Figure 1.

Figure 4 is a sectional view showing an arrangement for the manufacture of a modified form of the colonic tube.

Figure 5 is a cross section showing the modified form of the tube, the partition therein being shown as disposed at one side thereof.

The tube herein referred to has an external shape and length substantially identical with the tube shown in the patent granted to me August 8, 1922, and reissued under date of January 12, 1926, bearing the Reissue No. 16,251, for improvements in "medical apparatus for use in procto-therapy".

In the present invention, however, the tube is divided lengthwise to form two passages 10 and 11. In the preferred form of the tube, the passages are divided by a partition 12. The passage 10 extends to and cooperates with the opening 13 in the tube, while the passage 11 extends to and cooperates with the opening 14. At the inner end each passage communicates with short glass connecting tubes 15 and 16, which in turn are operatively and removably connected with elastic tubes 17 and 18 of the valve casing 19 wihch is provided with rotary valves 20 and 21.

The irrigating vehicle is supplied through the extension 22 and valve 20 to the colonic tube and the passage 10 therein.

It will also be understood that attached to the extension 23 is a drainage tube or member by which the material flowing from the colonic tube through the passage 11 thereof and the valve 21, is delivered to a suitable receptacle or waste.

The valves 20 and 21 are each provided with any suitable device by means of which said valves may be operated. When thus provided, and the colonic tube having been gradually inserted in operative position such as indicated and set forth in the above cited patent and reissue thereof:

The operation is as follows:

Irrigating or cleansing fluid is introduced from a supply attached to the extension 22 by opening the valve 20 allowing the vehicle to flow into the passage 10 of the colonic tube. If it is intended to temporarily dilate the area of the colon adjacent the end of the colonic tube, the valve 21 is maintained closed. When it is thought to relieve the dilation or to deflate the colon, the valve 20 is closed and the valve 21 is opened. It will be observed that when the valve 20 is closed, the irrigating fluid which has been introduced into the passage 10 of the colonic tube is held trapped therein. This prevents any undesirable material from entering the tube 10, thereby possibly contaminating the same, while the objectionable material mixed with the irrigating fluid such as has been used to dilate the colon is drawn off through the passage 11, valve 21 and extension 20.

If, however, it is desired to maintain a constant flow from the intestines, this may be accomplished by opening both the valve 20 and 21, in which case the irrigating or other fluid delivered through the passage 10 and opening 13, will be immediately withdrawn through the opening 14 and the passage 11 of the colonic tube.

In all cases, it will be observed that the passage 10 through which the fluids are primarily introduced into the colon are preserved from any contaminating matter.

In Figures 4 and 5, a modified form of the tube is disclosed, the modification consisting in providing a relatively enlarged flexible partition 24, which as shown in Figure 5, will be forced to one side or the other of the tube 25 when fluid is introduced through one or other of the passages 10 and 11.

In Figure 5, the partition 24 is disclosed as being forced over against the side wall of the passage 11, thereby increasing the capacity of the passage 10. If now the valve 21 should be opened and the valve 20 be closed, the partition 24 would be forced to the opposite side of the tube 25 to rest in juxtaposed relation to the side wall of the passage 10. The suggested preliminary construction of the tube as shown in Figure 4 may, of course, be varied to suit manufacturing conditions, it only being desired to show how very flexible a tube having passages for introduction and evacuation may be constructed if desired.

I claim:

1. In an apparatus as characterized, a flexible tube elongated for extension through the colonic region of the intestinal tract, said tube having a plurality of passages extending lengthwise and open coincidently at the rear end thereof, said tube having a closed forward extremity, and openings into said passages, said openings being arranged in spaced relation to said closed extremity, and in staggered relation to one another.

2. In an apparatus as characterized, a flexible tube elongated for extension through the colonic region of the intestinal tract, said tube having a plurality of passages extending lengthwise and open coincidently at the rear end thereof, said tube having a closed forward extremity, and openings into said passages, said openings being arranged in spaced relation to said closed extremity and in staggered relation to one another; means for introducing liquid into and through one of said passages for delivery through one of said openings; and means for withdrawing said liquid through the other of said openings and passages.

3. In an apparatus as characterized, a flexible tube elongated for extension through the colonic region of the intestinal tract, said tube having a plurality of passages extending lengthwise and open coincidently at the rear end thereof, said tube having a closed forward extremity, said extremity being pointed for introduction through intestinal passages.

4. As a new article of manufacture, an intestinal irrigation tube adapted for irrigating the colon comprising a relatively long single circular tubular member flexible throughout its length having a centrally disposed longitudinally extending partition forming an inlet supply channel and an outlet waste channel, both of said channels having their outer ends open and their inner ends closed, said channels having openings on the opposite sides of said tube near their inner ends.

OSCAR BOTO SCHELLBERG.